(12) United States Patent
Kupnik et al.

(10) Patent No.: US 7,843,022 B2
(45) Date of Patent: Nov. 30, 2010

(54) HIGH-TEMPERATURE ELECTROSTATIC TRANSDUCERS AND FABRICATION METHOD

(75) Inventors: Mario Kupnik, Mountain View, CA (US); Butrus T. Khuri-Yakub, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 176 days.

(21) Appl. No.: 12/288,344

(22) Filed: Oct. 17, 2008

(65) Prior Publication Data

US 2009/0140357 A1   Jun. 4, 2009

Related U.S. Application Data

(60) Provisional application No. 60/999,641, filed on Oct. 18, 2007.

(51) Int. Cl.
*H01L 29/84* (2006.01)
(52) U.S. Cl. .............................. 257/416; 257/E29.324; 257/E21.598; 438/52

(58) Field of Classification Search .................. 257/416, 257/E29.324, E21.598; 438/50, 53
See application file for complete search history.

(56) References Cited

U.S. PATENT DOCUMENTS 6,958,255 B2 * 10/2005 Khuri-Yakub et al. ......... 438/48

* cited by examiner

*Primary Examiner*—Zandra Smith
*Assistant Examiner*—Paul E Patton
(74) *Attorney, Agent, or Firm*—Lumen Patent Firm

(57) ABSTRACT

A high temperature micromachined ultrasonic transducer (HTCMUT) is provided. The HTCMUT includes a silicon on insulator (SOI) substrate having a doped first silicon layer, a doped second silicon layer, and a first insulating layer disposed between the first and second silicon layers. A cavity is disposed in the first silicon layer, where a cross section of the cavity includes a horizontal cavity portion on top of vertical cavity portions disposed at each end of the horizontal cavity portion, and the vertical cavity portion spans from the first insulating layer through the first silicon layer, such that a portion of the first silicon layer is isolated by the first insulating layer and the cavity. A membrane layer is disposed on the first silicon layer top surface, and spans across the cavity. A bottom electrode is disposed on the bottom of the second silicon layer.

33 Claims, 12 Drawing Sheets

HIGH-TEMPERATURE ELECTROSTATIC TRANSDUCERS AND FABRICATION METHOD

CROSS-REFERENCE TO RELATED APPLICATIONS

This application is cross-referenced to and claims the benefit from U.S. Provisional Patent Application 60/999,641 filed Oct. 18, 2007, where is hereby incorporated by regerence.

FIELD OF THE INVENTION

The invention relates generally to electrostatic transducers. More particularly, the invention relates to high temperature electrostatic transducers.

BACKGROUND

Electrostatic transducers require an insulating structure/layer between their electrodes. In general, this insulating structure/layer has two main functions: it provides electrical isolation so an electrical charge can build up and it gives mechanical support. In state-of-the-art transducers, such as capacitive micromachined ultrasonic transducers (CMUTs), this insulating structure/layer is the main limiting factor in terms of device operation at high temperatures. The likelihood of an electrical breakdown of the insulation structure is dramatically increased at elevated temperatures. Further, parasitic capacitance in the insulation layer will significantly degrade the transducer sensitivity at elevated temperatures due to an increased mobility of trapped charges, for example alkali ions in silicon dioxide, and bias-temperature (BT) stress. Another main limiting factor for high-temperature operation are thermal-expansion related stress effects, when the electrostatic transducer is exposed to high temperatures.

Current fabrication methods leave the CMUT cell unprotected during the fabrication process, resulting in contamination of the cell cavity. Current CMUT cells do not that have thick insulation layers that are independent from the cavity height, which limits their high temperature and performance.

Accordingly, there is a need to develop a CMUT structure and fabrication method that reduces the number of fabrications steps, improves CMUT cell structure by increasing electrical breakdown voltage and reducing parasitic capacitance, provides better design flexibility and high controllability for the whole frequency range in which CMUT cells can be used (1 kHz-300 MHz). What is further needed is a CMUT cell that is completely protected mechanically and protected against contaminations by the membrane silicon-on-insulator (SOI) wafer in an early stage of the fabrication.

SUMMARY OF THE INVENTION

To address the shortcomings in the art, a high temperature micromachined ultrasonic transducer (HTCMUT) is provided. The HTCMUT of the current invention includes a silicon on insulator (SOI) substrate, where the SOI substrate has a doped first silicon layer and a first insulating layer, a doped second silicon layer, where the first insulating layer is disposed between the first silicon layer and the second silicon layer. The HTCMUT further includes a cavity in the first silicon layer, where a cross section of the cavity includes a horizontal cavity portion on top of vertical cavity portions disposed at each end of the horizontal cavity portion, and the vertical cavity portion spans from the first insulating layer through the first silicon layer, such that a portion of the first silicon layer is isolated by the first insulating layer and the cavity. A membrane layer is disposed on the first silicon layer top surface, and spans across the cavity, and a bottom electrode is disposed on a bottom surface of the second silicon layer.

According to one aspect of the invention, the silicon on insulator (SOI) substrate and the doped second silicon layer are a SOI wafer, where the SOI wafer has the doped first silicon layer, a buried first insulating layer and doped second silicon layer, where the first insulating layer is disposed between the first silicon layer and the second silicon layer.

In another aspect, the first insulating layer is an oxide layer.

According to another aspect of the invention further comprises a top electrode disposed on a top surface of the membrane layer, where the membrane layer can be a nonconductive layer or a conductive layer such as an undoped silicon, silicon nitride, undoped silicon carbide, nonconductive diamond, doped silicon, doped silicon carbide, or conductive diamond.

In a further aspect, the membrane layer is made from a conductive material such as doped silicon, doped silicon from a second the SOI substrate, silicon nitride, doped silicon carbide, doped polycrystalline silicon, undoped polycrystalline or conductive diamond, where the membrane layer is also an electrode.

According to another aspect of the invention, the HTCMUT further has a second insulating layer, wherein the second insulating layer is disposed on a top surface of the first silicon layer, on the walls of the vertical cavity portion and on a top surface of the isolated silicon layer portion of the first silicon layer, wherein the isolated silicon layer portion is enveloped by the first insulating layer and the second insulating layer. Here, the second insulating layer can be an insulating oxide layer having a thickness in a range from 10 nm to 30 μm.

In a further aspect, the cavity can be a vacuum or a gas, where the gas can be air, noble gas, nitrogen, oxygen, hydrogen or carbon dioxide.

According to yet another aspect of the invention, the HTCMUT further includes at least one conductive via disposed through the second silicon layer and into the isolated silicon layer, where the conductive via is in contact with the bottom electrode layer. Here, the first silicon layer of the SOI substrate is undoped, and the isolated silicon layer is doped, where the via is a conduit for doping the isolated silicon layer. Additionally, the conducting via can have a hole diameter in a range of 1 μm to 100 μm.

In another aspect, the first silicon layer can have a thickness in a range from 1 μm to 1,000 μm.

In a further aspect, the second silicon layer can have a thickness in a range from 1 μm to 1,000 μm.

In yet another aspect, the membrane layer can have a thickness in a range from 0.1 μm to 500 μm.

In a further aspect, the buried oxide layer can have a thickness in a range from 0.01 μm to 60 μm.

In one aspect, the horizontal cavity portion has a thickness in a range from 10 nm to 500 μm.

In a further aspect, the isolated silicon layer can have a thickness in a range from 1 μm to 1,000 μm.

In a further aspect of the invention, the first insulating layer disposed on the top surface of the first silicon layer is thicker than a second insulating layer disposed on the vertical cavity portion and on the top surface of the isolated silicon layer portion. Here, the second insulating layer disposed on the vertical cavity portion and the top surface of the isolated silicon layer portion can have a thickness in a range of 1 nm to 10 µm.

According to one embodiment, the invention includes a method of fabricating a HTCMUT. The method includes providing a first silicon on insulator (SOI) substrate having a doped first silicon layer and a first insulating layer, providing a doped second silicon layer, where the first insulating layer is disposed between the first silicon layer and the second silicon layer, forming a horizontal cavity portion in the first silicon layer, and forming a vertical cavity portion at each end of the horizontal cavity portion, where the vertical cavity portion spans from the first insulating layer through the first silicon layer. The method further includes depositing a second insulating layer on a top surface of the first silicon layer, on the walls of the vertical cavity portion and on a top surface of the isolated silicon layer portion of the first silicon layer, where the isolated silicon layer portion is enveloped by the first insulating layer and the second insulating oxide layer. The method further includes bonding a silicon substrate to the second insulating layer of the top surface of the first silicon layer, where a bottom region of the silicon substrate is a conductive membrane layer, removing a top region of the silicon substrate, wherein the silicon substrate bottom region forms the membrane layer across the cavity, and depositing a bottom electrode layer on the second silicon layer.

According to one aspect of the current invention the method further includes depositing a top electrode on a top surface of the membrane layer, where the membrane layer is a nonconductive layer or a conductive layer such as undoped silicon, silicon nitride, undoped silicon carbide, nonconductive diamond, doped silicon, doped silicon from a second the SOI substrate, silicon nitride, doped silicon carbide, or conductive diamond.

In a further aspect, the membrane layer is made from a conductive material such as doped silicon, doped silicon from a second the SOI substrate, doped silicon carbide, or conductive diamond, wherein the membrane layer is also an electrode.

According to one aspect of the current invention where, before removing the top region of the silicon substrate, the method further includes providing at least one contact hole disposed through the second silicon layer and into the isolated silicon layer, and depositing a conductive layer in the contact hole, where the conductive layer in the contact hole provides a conductive via to the isolated silicon layer from the bottom electrode layer.

In a further aspect, the first SOI substrate has an undoped first silicon layer, where the isolated silicon layer is undoped, and before removing the top region of the silicon substrate, the method further includes providing at least one contact hole disposed through the second silicon layer and into the isolated silicon layer, doping the undoped isolated silicon layer through the contact hole, and depositing a conductive layer in the contact hole, where the conductive layer in the contact hole provides a conductive via to the isolated silicon layer from the bottom electrode layer.

In yet another aspect of the current method, the insulating layer disposed on the vertical cavity portion and the top surface of the isolated silicon layer portion has a thickness in a range of 1 nm to 10 µm.

In one aspect, the bonding of the silicon substrate to the insulating layer is done in a vacuum or in a gas, where the cavity has the vacuum or the gas. he gas can be air, noble gas, nitrogen, oxygen, hydrogen or carbon dioxide.

In another aspect the conductive bottom region of the silicon substrate can made from conductive material such as doped silicon, doped silicon carbide, or conductive diamond.

According to another embodiment, the invention is a method of fabricating a HTCMUT that includes providing a first silicon on insulator (SOI) substrate, where the first SOI has a doped first silicon layer and a first insulator layer, providing a doped second silicon layer, where the first insulator layer is disposed between the first silicon layer and the second silicon layer. The current method further includes forming a horizontal cavity portion in the first silicon layer, forming a vertical cavity portion at each end of the horizontal cavity portion, where the vertical cavity portion spans from the first insulating layer through the first silicon layer, bonding a silicon substrate to the top surface of the first silicon layer, where a bottom region of the silicon substrate is a membrane layer, removing a top region of the silicon substrate, where the bottom region of the silicon substrate forms the membrane layer across the cavity, and depositing a bottom electrode layer on the second silicon layer.

According to one aspect of the current embodiment, the method further includes depositing a top electrode on a top surface of the membrane layer, where the membrane layer is a nonconductive layer or a conductive layer such as undoped silicon, silicon nitride, undoped silicon carbide, nonconductive diamond, doped silicon, doped silicon from a second the SOI substrate, silicon nitride, doped silicon carbide, or conductive diamond.

In yet another aspect of the current method, the membrane layer is made from a conductive material selected from a group consisting of doped silicon, doped silicon from a second the SOI substrate, doped silicon carbide, and conductive diamond, wherein the membrane layer is also an electrode.

In yet another aspect of the current method, before removing the top region of the silicon substrate, the method further includes providing at least one contact hole disposed through the second silicon layer and into the isolated silicon layer, an depositing a conductive layer in the contact hole, where the conductive layer in the contact hole provides a conductive via to the isolated silicon layer from the bottom electrode layer.

In another aspect of the current method, the first SOI substrate comprises an undoped first silicon layer, where the isolated silicon layer is undoped, where before removing the silicon substrate top layer, the method further includes providing at least one contact hole disposed through the second silicon layer and into the isolated silicon layer, doping the undoped isolated silicon layer through the contact hole, and depositing a conductive layer in the contact hole, where the conductive layer in the contact hole provides a conductive via to the isolated silicon layer from the bottom electrode layer.

In one aspect of the current method, the bonding of the silicon substrate to the top surface of the first silicon layer is done in a vacuum or in a gas, where the cavity includes the vacuum or the gas such as air, noble gas, nitrogen, oxygen, hydrogen, and helium.

According to another embodiment, the current invention is a HTCMUT that includes a doped first silicon layer, a first insulating layer, where the first conductive silicon layer is disposed on the first insulating layer. The invention further includes a cavity in the first silicon layer, where a cross section of the cavity includes a horizontal cavity portion on top of vertical cavity portions disposed at each end of the horizontal cavity portion, where the vertical cavity portion spans from the insulating layer through the first silicon layer, where a portion of the first silicon layer is isolated by the insulating layer and the cavity. The invention also includes a membrane layer, where the membrane layer is disposed on the first silicon layer top surface, where the membrane layer spans across the cavity, and a bottom electrode, where the bottom electrode is disposed on a bottom surface of the first insulating layer.

According to one aspect of the current embodiment, the first insulating layer can be oxide, quartz, glass, pyrex, soda lime, borosilicate, borofloat glass, fused quartz, fused silica, alumina, or sapphire.

In another aspect, the HTCMUT further includes a top electrode, where the top electrode is disposed on a top surface of the membrane layer, where the membrane layer is a non-conductive layer or a conductive layer such as of undoped silicon, silicon nitride, undoped silicon carbide, nonconductive diamond, doped silicon, doped silicon carbide, or conductive diamond.

In another aspect of the current embodiment, the membrane layer is made from a conductive material such as doped silicon, doped silicon from a second the SOI substrate, silicon nitride, doped silicon carbide, doped polycrystalline silicon, undoped polycrystalline or conductive diamond, wherein the membrane layer is also an electrode.

In a further aspect, the HTCMUT further includes a second insulating layer, where the second insulating layer is disposed on a top surface of the first silicon layer, on the walls of the vertical cavity portion and on a top surface of the isolated silicon layer portion of the first silicon layer, where the isolated silicon layer portion is enveloped by the first insulating layer and the second insulating layer. Here, the second insulating layer is an insulating oxide layer. In another aspect, the second insulating layer has a thickness in a range of 1 nm to 30 μm.

In yet another aspect, the cavity includes a vacuum or a gas, where the gas can be air, noble gas, nitrogen, oxygen, hydrogen and carbon dioxide.

In another aspect of the current embodiment, the HTCMUT further includes at least one conductive via, where the conductive via is disposed through the first insulating layer and into the isolated silicon layer, where the conductive via is in contact with the bottom electrode layer. Here, the conducting via has a hole diameter in a range of 1 μm to 100 μm.

According to another aspect, the first insulating layer has a thickness in a range from 1 μm to 1,000 μm.

In a further aspect, the first silicon layer has a thickness in a range from 1 μm to 1,000 μm.

According to another aspect, the horizontal cavity portion has a thickness in a range from 10 nm to 500 μm.

In yet another aspect of the invention, the isolated silicon layer has a thickness in a range from 1 μm to 1,000 μm.

BRIEF DESCRIPTION OF THE FIGURES

The objectives and advantages of the present invention will be understood by reading the following detailed description in conjunction with the drawing, in which.

DETAILED DESCRIPTION OF THE INVENTION

Figure 1:
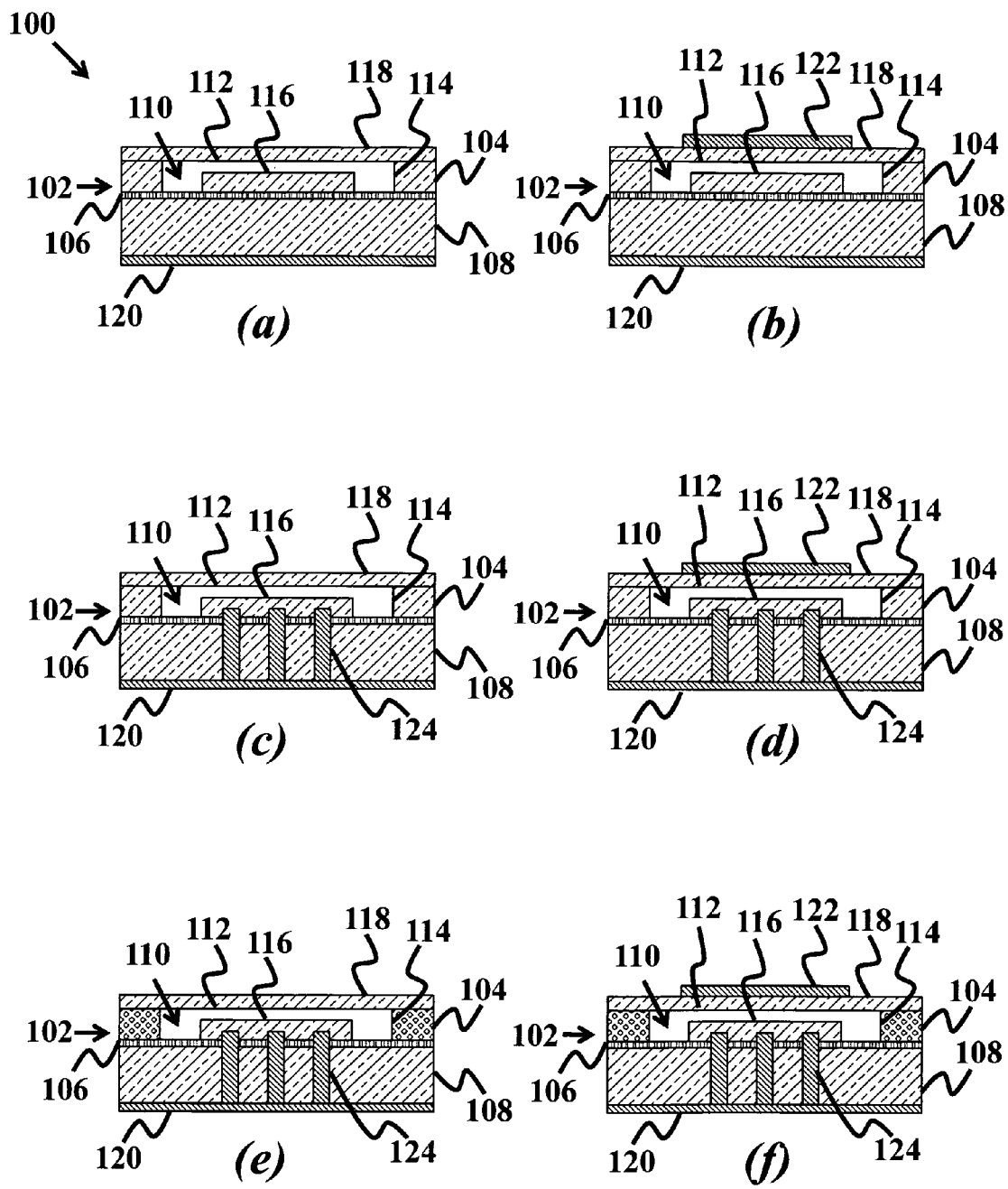
FIGS. 1(a)-1(r) show various embodiments of the HTCMUT cell according to the present invention.
Figure 1:
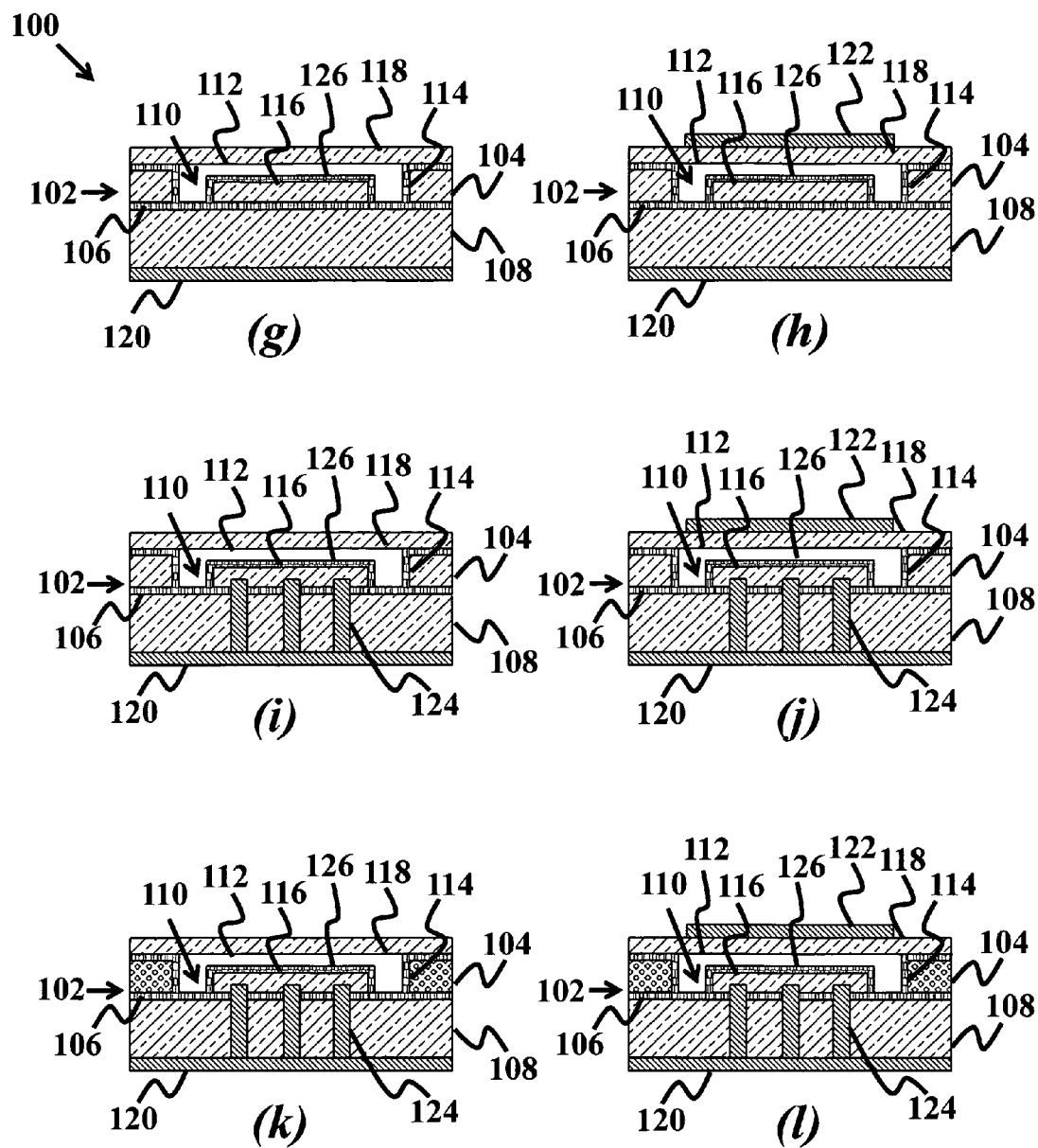
Figure 1:
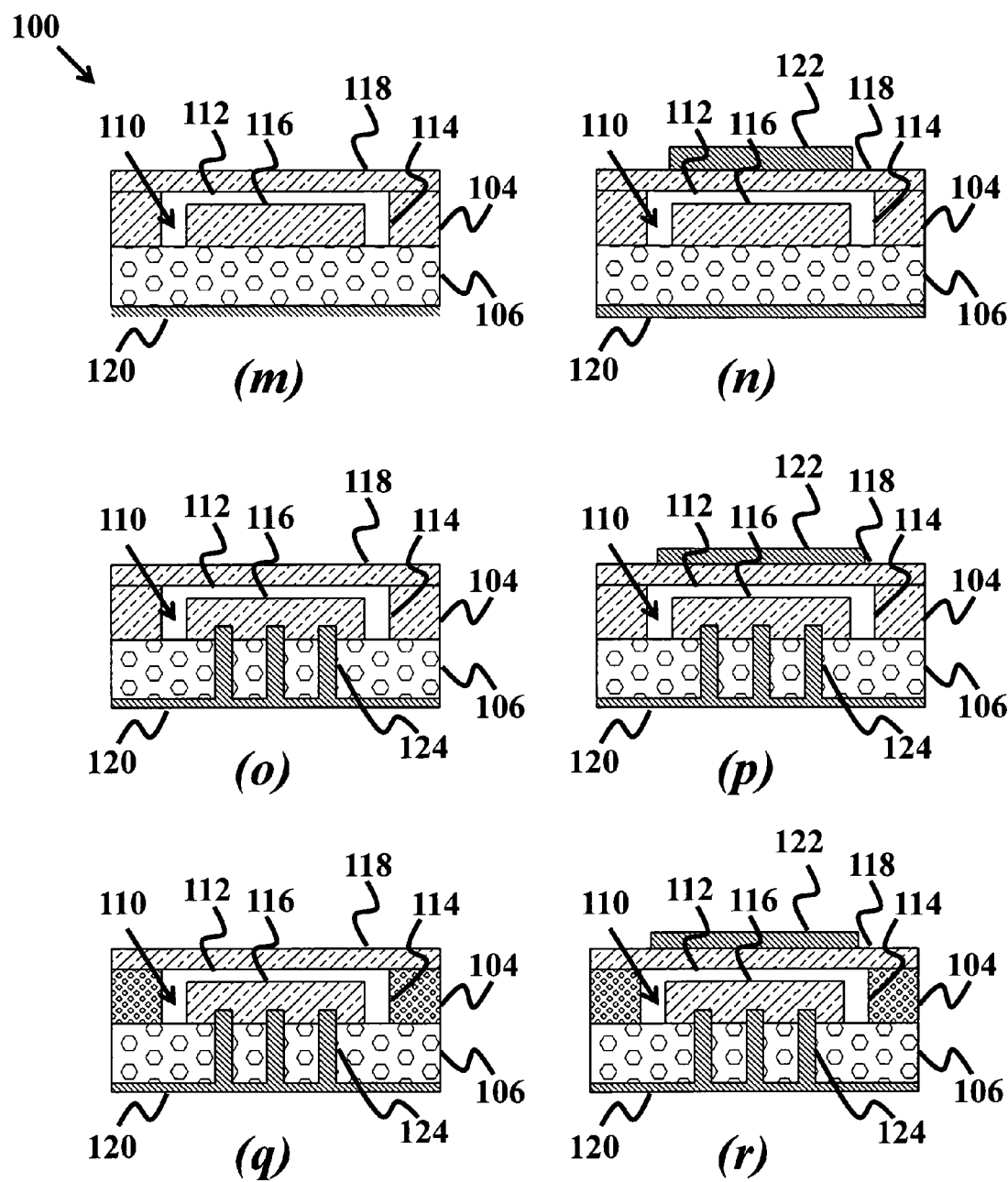

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

FIGS. 1(a)-1(r) show different embodiments of the high temperature micromachined ultrasonic transducer (HTCMUT), according to the current invention. FIG. 1(a) shows a HTCMUT having a silicon on insulator (SOI) substrate 102, wherein the SOI substrate 102 includes a doped first silicon layer 104 and a first insulating layer 106, a doped second silicon layer 108, where the first insulating layer 106 is disposed between the first silicon layer 104 and the second silicon layer 108. The HTCMUT 100 further includes a cavity 110 in the first silicon layer 104, where a cross section of the cavity 110 includes a horizontal cavity portion 112 on top of vertical cavity portions 114 disposed at each end of the horizontal cavity portion 112, and the vertical cavity portion 114 spans from the first insulating layer 106 through the first silicon layer 104, such that a portion of the first silicon layer is isolated 116 by the first insulating layer 106 and the cavity 110. A membrane layer 118 is disposed on the first silicon layer 104 top surface, and spans across the cavity 110, and a bottom electrode 120 is disposed on a bottom surface of the second silicon layer 108.

In all of the embodiments of the current invention, the cavity 110 can be a vacuum or a gas, where the gas can be air, noble gas, nitrogen, oxygen, hydrogen or carbon dioxide.

FIG. 1(b) shows another embodiment of the HTCMUT 100 according to the current invention. The HTCMUT 100 shown in FIG. 1(b) includes the aspects of the embodiment of FIG. 1(a), and further includes a top electrode 122, where the top electrode 122 is disposed on a top surface of the membrane layer 118. It is understood with the other embodiments described below that, though the membrane layer 118 is shown as a conductive layer with the top electrode 122, it can also be a nonconductive membrane layer 118 with the top electrode 122. Some exemplary materials that are useful materials for the membrane layer can be undoped silicon, silicon nitride, undoped silicon carbide, nonconductive diamond, doped silicon, doped silicon carbide, and conductive diamond.

According to the current invention, the membrane layer 118 can made from a conductive material such as doped silicon, doped silicon from a second the SOI substrate, silicon nitride, doped silicon carbide, doped polycrystalline silicon, undoped polycrystalline or conductive diamond, where the membrane layer is also an electrode.

FIG. 1(c) shows another embodiment of the HTCMUT 100 according to the current invention. The HTCMUT 100 shown in FIG. 1(c) includes the aspects of the embodiment of FIG. 1(a), and further includes at least one conductive via 124 disposed through the second silicon layer 108 and into the isolated silicon layer 116, where the conductive via 124 is in contact with the bottom electrode layer 120. According to the current invention, the conducting via of the different embodiments can have a hole diameter in a range of 1 μm to 100 μm.

FIG. 1(*d*) shows another embodiment of the HTCMUT 100 according to the current invention. The HTCMUT 100 shown in FIG. 1(*d*) includes the aspects of the embodiment of FIG. 1(*c*), and further includes a top electrode 122, where the top electrode 122 is disposed on a top surface of the membrane layer 118.

FIG. 1(*e*) shows another embodiment of the HTCMUT 100 according to the current invention. The HTCMUT 100 shown in FIG. 1(*e*) includes the aspects of the embodiment of FIG. 1(*c*), however in this embodiment the first silicon layer 104 is an undoped silicon, and the conductive vias 124 are used to dope the isolated silicon layer portion 116, where the remainder of the first silicon layer 104 disposed on the ends of the cavity 110 remain undoped, as represented by the different area hatch marks in the first silicon layer 104.

FIG. 1(*f*) shows another embodiment of the HTCMUT 100 according to the current invention. The HTCMUT 100 shown in FIG. 1(*f*) includes the aspects of the embodiment of FIG. 1(*e*), and further includes a top electrode 122, where the top electrode 122 is disposed on a top surface of the membrane layer 118.

FIG. 1(*g*) shows another embodiment of the HTCMUT 100 according to the current invention. The HTCMUT 100 shown in FIG. 1(*g*) includes the aspects of the embodiment of FIG. 1(*a*), and further includes a second insulating layer 126 disposed on a top surface of the first silicon layer 106, on the walls of the vertical cavity portion 114 and on a top surface of the isolated silicon layer portion 116 of the first silicon layer 104, where the isolated silicon layer portion 116 is enveloped by the first insulating layer 106 and the second insulating layer 126. In the above embodiments, the second insulating layer 126 can be an insulating oxide layer having a thickness in a range from 10 nm to 30 μm.

FIG. 1(*h*) shows another embodiment of the HTCMUT 100 according to the current invention. The HTCMUT 100 shown in FIG. 1(*h*) includes the aspects of the embodiment of FIG. 1(*g*), and further includes a top electrode 122, where the top electrode 122 is disposed on a top surface of the membrane layer 118.

FIG. 1(*i*) shows another embodiment of the HTCMUT 100 according to the current invention. The HTCMUT 100 shown in FIG. 1(*i*) includes the aspects of the embodiment of FIG. 1(*g*), and further includes at least one conductive via 124 disposed through the second silicon layer 108 and into the isolated silicon layer 116, where the conductive via 124 is in contact with the bottom electrode layer 120.

FIG. 1(*j*) shows another embodiment of the HTCMUT 100 according to the current invention. The HTCMUT 100 shown in FIG. 1(*j*) includes the aspects of the embodiment of FIG. 1(*i*), and further includes a top electrode 122, where the top electrode 122 is disposed on a top surface of the membrane layer 118.

FIG. 1(*k*) shows another embodiment of the HTCMUT 100 according to the current invention. The HTCMUT 100 shown in FIG. 1(*k*) includes the aspects of the embodiment of FIG. 1(*i*), however in this embodiment the first silicon layer 104 is an undoped silicon, and the conductive vias 124 are used to dope the isolated silicon layer portion 116, where the remainder of the first silicon layer 104 disposed on the ends of the cavity 110 remain undoped, as represented by the different area hatch marks in the first silicon layer 104.

FIG. 1(*l*) shows another embodiment of the HTCMUT 100 according to the current invention. The HTCMUT 100 shown in FIG. 1(*l*) includes the aspects of the embodiment of FIG. 1(*k*), and further includes a top electrode 122, where the top electrode 122 is disposed on a top surface of the membrane layer 118.

In one aspect of the embodiment shown in FIGS. 1(*g*)-1(*l*), the first insulating layer disposed 106 on the top surface of the first silicon layer 108 is thicker than the second insulating layer 126 disposed on the vertical cavity portion 114 and on the top surface of the isolated silicon layer portion 116. Here, the second insulating layer 126 can have a thickness in a range of 1 nm to 10 μm.

FIG. 1(*m*) shows another embodiment of the HTCMUT 100 according to the current invention. The HTCMUT 100 shown in FIG. 1(*m*) includes the doped first silicon layer 104 and the first insulating layer 106 disposed on the doped first silicon layer 104. The cavity 110 is disposed in the first silicon layer 104, where the cross section of the cavity 110 includes a horizontal cavity portion 112 on top of vertical cavity portions 114 disposed at each end of the horizontal cavity portion 112, and vertical cavity portion 114 spans from the insulating layer 106 through the first silicon layer 104, where a portion of the first silicon layer 116 is isolated by the first insulating layer 106 and the cavity 110. The membrane layer 118 is disposed on the first silicon layer 118 top surface, where the membrane layer 118 spans across the cavity 110. Further, a bottom electrode 120 is disposed on a bottom surface of the first insulating layer 106. According to one aspect of the current embodiment, the first insulating layer 106 can be oxide, quartz, glass, pyrex, soda lime, borosilicate, borofloat glass, fused quartz, fused silica, alumina, or sapphire.

FIG. 1(*n*) shows another embodiment of the HTCMUT 100 according to the current invention. The HTCMUT 100 shown in FIG. 1(*n*) includes the aspects of the embodiment of FIG. 1(*m*), and further includes a top electrode 122, where the top electrode 122 is disposed on a top surface of the membrane layer 118. Here, the membrane layer 118 is shown as a conductive layer, however it can also be a nonconductive layer. Some exemplary materials that are useful materials for the membrane layer 118 can be undoped silicon, silicon nitride, undoped silicon carbide, nonconductive diamond, doped silicon, doped silicon carbide, and conductive diamond.

FIG. 1(*o*) shows another embodiment of the HTCMUT 100 according to the current invention. The HTCMUT 100 shown in FIG. 1(*o*) includes the aspects of the embodiment of FIG. 1(*m*), and further includes at least one conductive via 124 disposed through the second silicon layer 108 and into the isolated silicon layer 116, where the conductive via 124 is in contact with the bottom electrode layer 120.

FIG. 1(*p*) shows another embodiment of the HTCMUT 100 according to the current invention. The HTCMUT 100 shown in FIG. 1(*p*) includes the aspects of the embodiment of FIG. 1(*o*), and further includes a top electrode 122, where the top electrode 122 is disposed on a top surface of the membrane layer 118.

FIG. 1(*q*) shows another embodiment of the HTCMUT 100 according to the current invention. The HTCMUT 100 shown in FIG. 1(*q*) includes the aspects of the embodiment of FIG. 1(*o*), however in this embodiment the first silicon layer 104 is an undoped silicon, and the conductive vias 124 are used to dope the isolated silicon layer portion 116, where the remainder of the first silicon layer 104 disposed on the ends of the cavity 110 remain undoped, as represented by the different area hatch marks in the first silicon layer 104.

FIG. 1(*r*) shows another embodiment of the HTCMUT 100 according to the current invention. The HTCMUT 100 shown in FIG. 1(r) includes the aspects of the embodiment of FIG. 1(p), and further includes a top electrode 122, where the top electrode 122 is disposed on a top surface of the membrane layer 118.

It is understood that the above embodiments of the HTC-MUT can be used as a single cell or several cell which operate in parallel.

According to one aspect of the invention, the silicon on insulator (SOI) substrate 102, having the first doped silicon layer 104 and the first insulating layer 106, are combined with the doped second silicon layer 108 forming a SOI wafer (not shown), where the SOI wafer has the doped first silicon layer 104, a buried first insulating layer 106 and doped second silicon layer 108, where the first insulating layer 106 is disposed between the first silicon layer 104 and the second silicon layer 108. Further, the first insulating layer 106 can be an oxide layer.

In other aspects of the different embodiments, the first silicon layer 104 can have a thickness in a range from 1 μm to 1,000 μm, the second silicon layer 108 can have a thickness in a range from 1 μm to 1,000 μm, and the membrane layer 118 can have a thickness in a range from 0.1 μm to 500 μm. Further, the buried oxide layer 106 can have a thickness in a range from 0.01 μm to 60 μm, the horizontal cavity portion 112 can have thickness in a range from 10 nm to 500 μm, and the isolated silicon layer 116 can have a thickness in a range from 1 μm to 1,000 μm.

Figure 2:
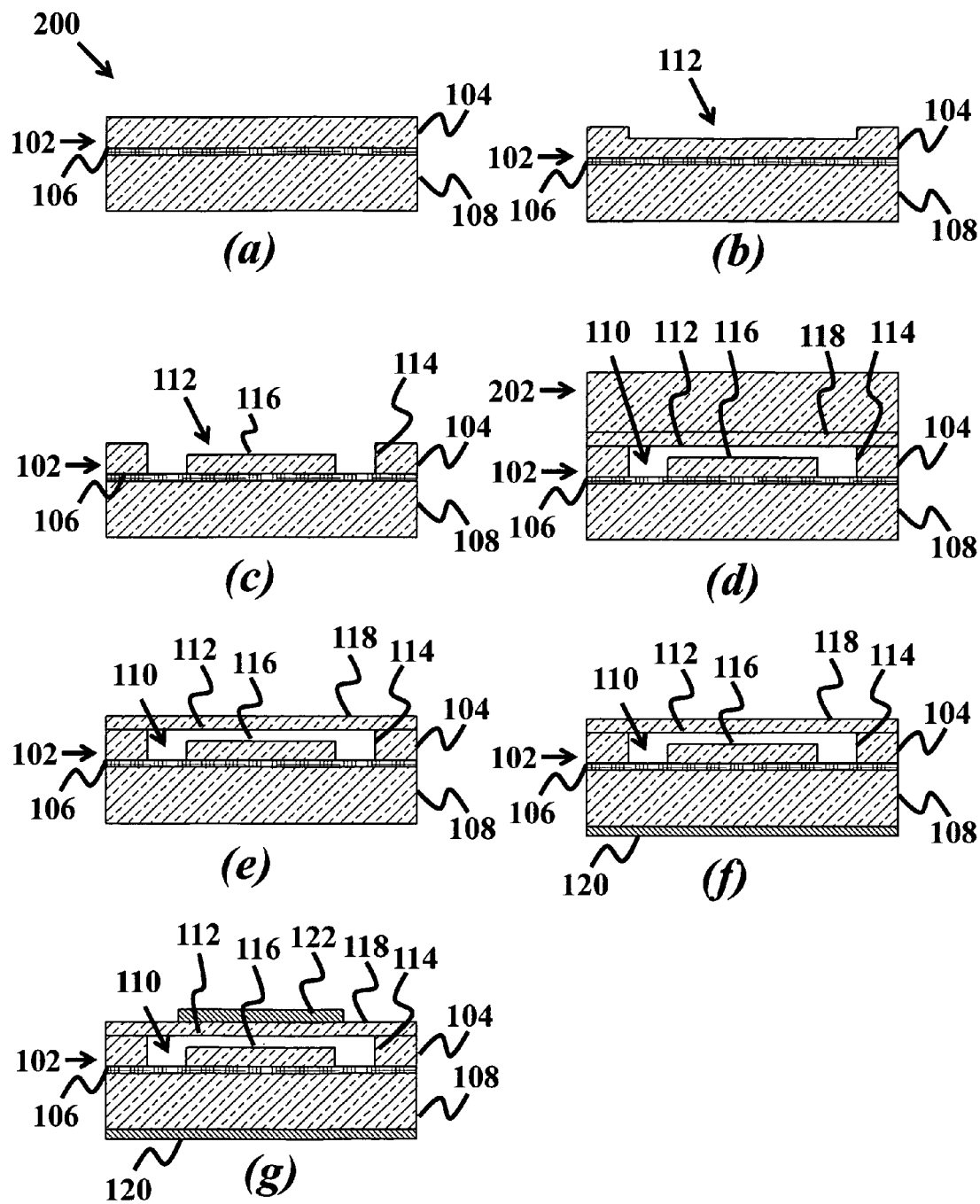
FIGS. 2(a)-2(g) show the steps of making different embodiments of the HTCMUT according to the present invention.

FIGS. 2(a)-2(g) show the steps for fabricating the HTC-MUT 200 described in FIGS. 1(a)-1(b) according to one embodiment of the invention. Beginning with FIG. 2(a) the steps include providing the first silicon on insulator (SOI) substrate 102 that has the doped first silicon layer 104 and the first insulating layer 106, and providing the doped second silicon layer 108, where the first insulating layer 106 is disposed between the first silicon layer 104 and the second silicon layer 108. FIG. 2(b) shows the step of forming the horizontal cavity portion 112 in the first silicon layer 104. FIG. 2(c) shows the step of forming the vertical cavity portions 114 at each end of the horizontal cavity portion 112, where the vertical cavity portion 114 spans from the first insulating layer 106 through the first silicon layer 104. FIG. 2(d) shows the step of bonding a silicon substrate 202 to the top surface of the first silicon layer 104, where a bottom region of the silicon substrate 202 is the membrane layer 118. FIG. 2(e) shows the step of removing the top region 204 of the silicon substrate 202, where the membrane layer 118 spans across the cavity 110. FIG. 2(f) shows the step of depositing the bottom electrode layer 120 on the second silicon layer 108. FIG. 2(g) shows step of fabricating the embodiment of FIG. 1(b), which includes depositing the top electrode 122 on the top surface of the membrane layer 118, where as discussed above it is understood with other embodiments described below that, though the membrane layer 118 is shown as a conductive layer with the top electrode 122, it can also be a nonconductive membrane layer 118 with the top electrode 122. Some exemplary materials that are useful materials for the membrane layer can be undoped silicon, silicon nitride, undoped silicon carbide, nonconductive diamond, doped silicon, doped silicon carbide, and conductive diamond.

Figure 3:
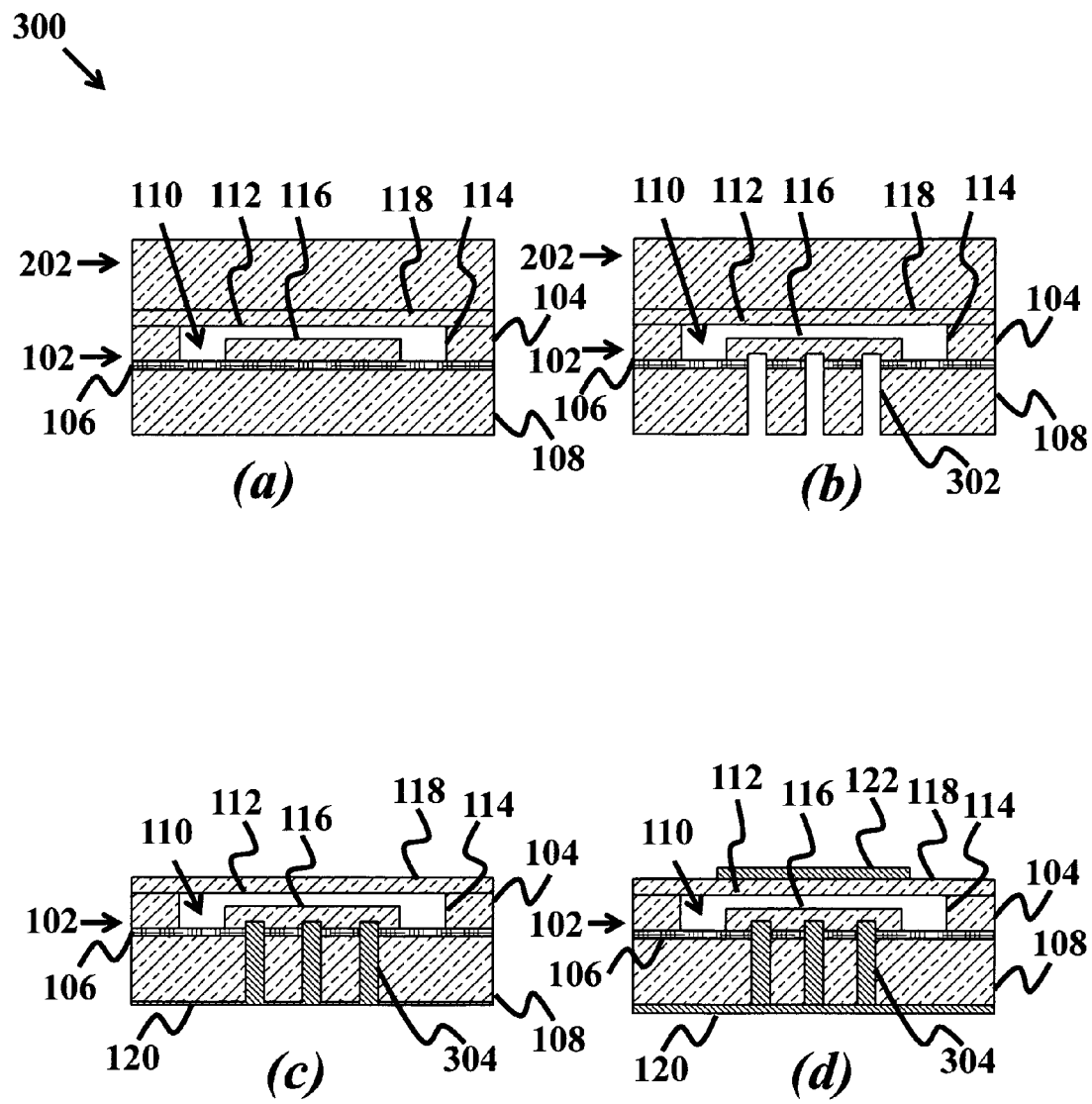
FIGS. 3(a)-3(h) show the steps of making different embodiments of the HTCMUT according to the present invention.
Figure 3:
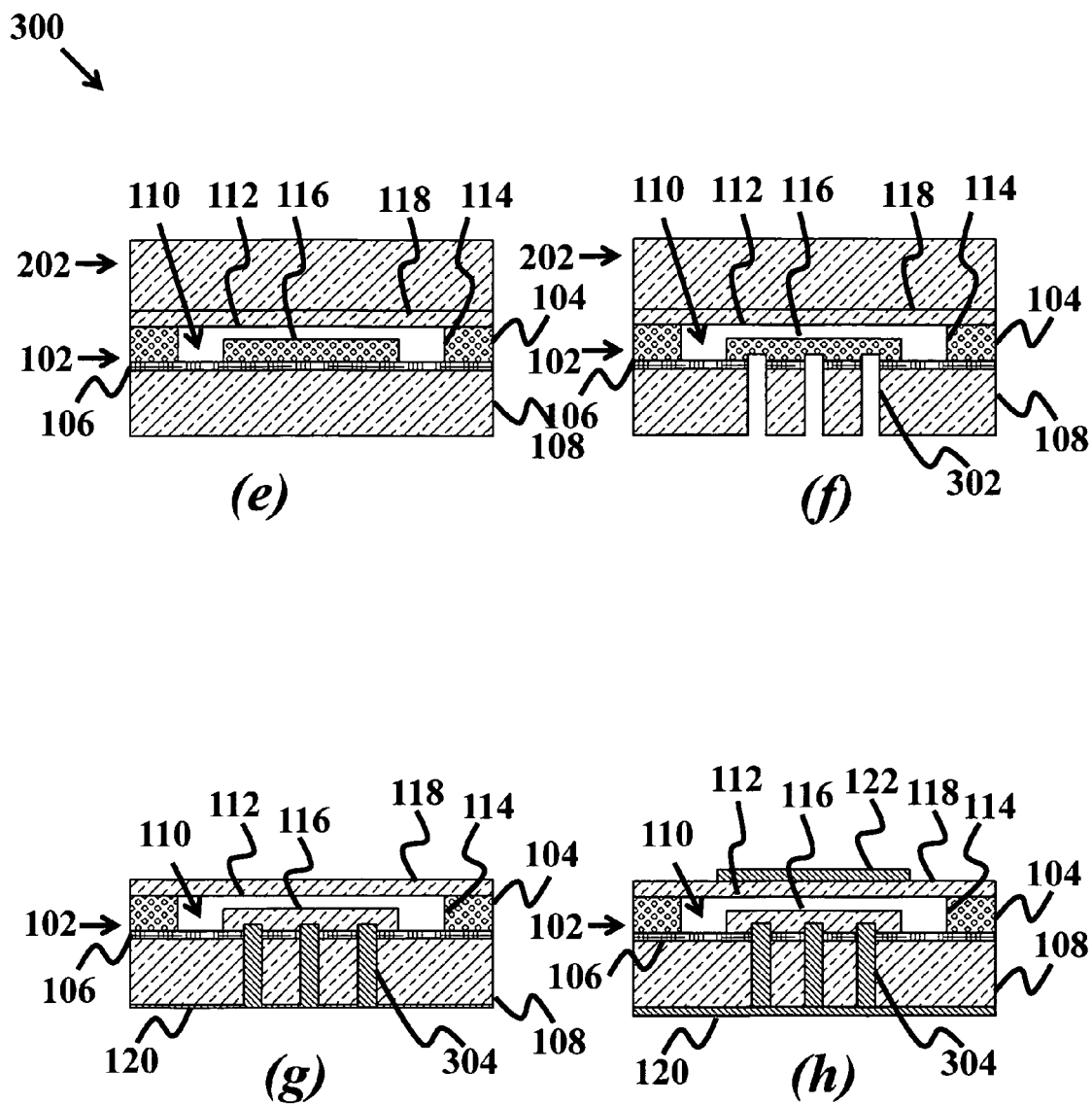

FIGS. 3(a)-3(d) show the steps for fabricating the conductive via-included embodiments 300 as shown in FIGS. 1(c) and 1(d). Referring to FIG. 3(a), before removing the top region of the silicon substrate, as shown in FIG. 2(d), the method further includes the steps of providing at least one contact hole 302 disposed through the second silicon layer 108 and into the isolated silicon layer 116, as shown in FIG. 3(b).

FIG. 3(c) shows the step of depositing a conductive layer 304 in the contact hole 302, where the conductive layer 304 in the contact hole 302 provides the conductive via 124 to the isolated silicon layer 116 from the bottom electrode layer 120 when it is deposited as shown in FIG. 3(d), where also shown is the top electrode 122 deposited on the membrane layer 118.

FIGS. 3(e)-3(h) show the steps for fabricating other conductive via-included embodiments show in FIGS. 1(e) and 1(f), where the first SOI substrate 102 has an undoped first silicon layer 104, and the isolated silicon layer 116 is undoped. Referring to FIG. 3(e), before removing the top region of the silicon substrate as shown in FIG. 2(d), the method further includes the steps of providing at least one contact hole 302 disposed through the second silicon layer 108 and into the isolated silicon layer 116, doping the undoped isolated silicon layer through the contact hole 302, as shown in the transition from FIG. 3(f) to FIG. 3(g). Then depositing a conductive layer 304 in the contact hole 302, where the conductive layer 304 in the contact hole 302 provides the conductive via 124 to the isolated silicon layer 116 from the bottom electrode layer 120 when it is deposited as shown in FIG. 3(g), where FIG. 3(h) shows the top electrode 122 deposited on the membrane layer 118.

FIGS. 4(a)-4(h) show the steps for fabricating the HTC-MUT 400 described in FIGS. 1(g)-1(h) according to one embodiment of the invention. Beginning with FIG. 4(a) the steps include providing the first silicon on insulator (SOI) substrate 102 that includes the doped first silicon layer 104 and the first insulating layer 106, and providing the doped second silicon layer 108, where the first insulating layer 106 is disposed between the first silicon layer 104 and the second silicon layer 108.

Figure 4:
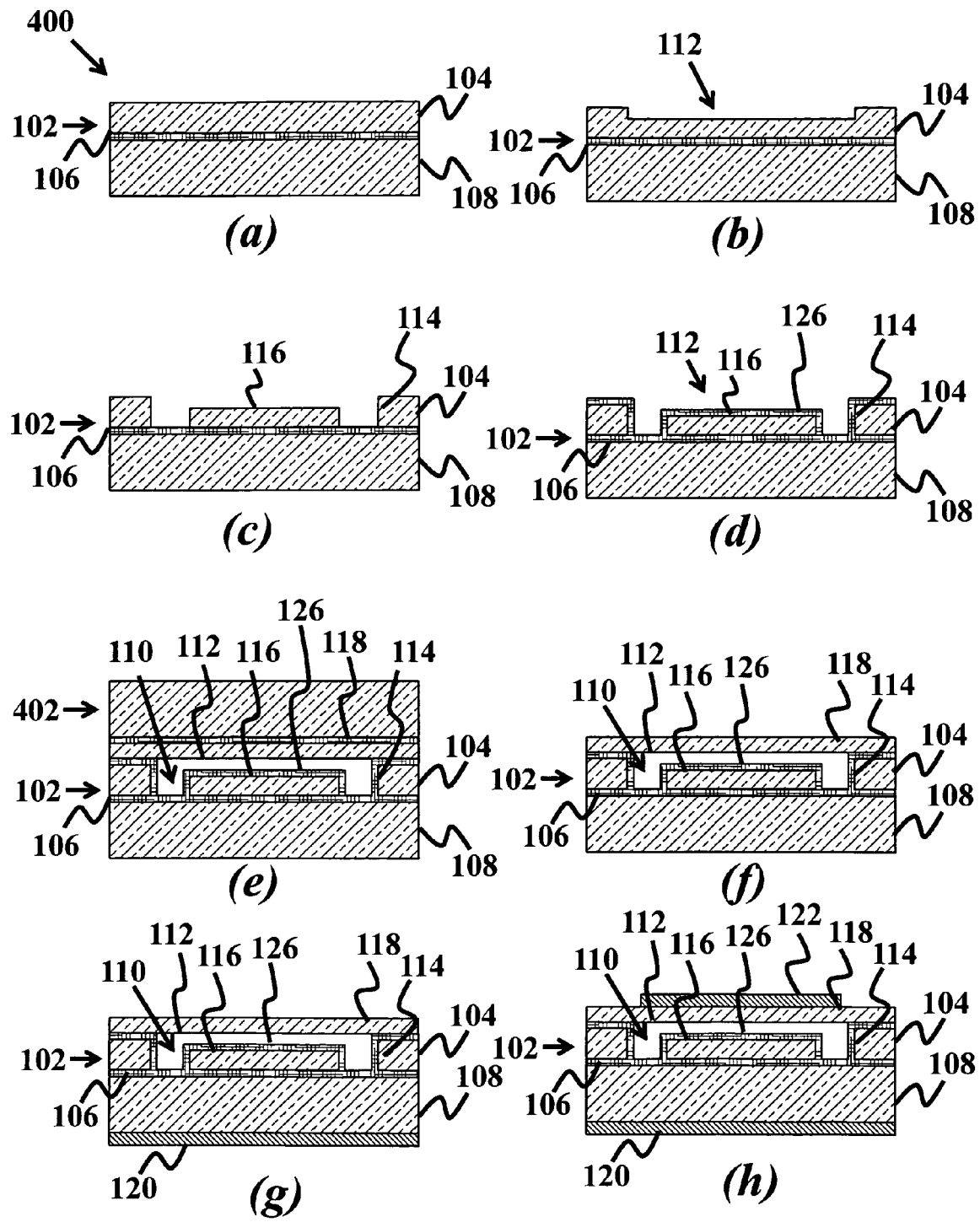
FIGS. 4(a)-4(h) show the steps of making different embodiments of the HTCMUT according to the present invention.

FIG. 4(b) shows the step of forming the horizontal cavity portion 112 in the first silicon layer 104.

FIG. 4(c) shows the step of forming the vertical cavity portions 114 at each end of the horizontal cavity portion 112, where the vertical cavity portion 114 spans from the first insulating layer 106 through the first silicon layer 104.

FIG. 4(d) depositing a second insulating layer 126 on the walls of the vertical cavity portion 114 and on a top surface of the isolated silicon layer portion 116 of the first silicon layer 104, where the isolated silicon layer portion 116 is enveloped by the first insulating layer 106 and the second insulating layer 126.

FIG. 4(e) shows the step of bonding a silicon substrate 402 to the second insulating layer 126 of the top surface of the first silicon layer 104, where a bottom region of the silicon substrate 402 is the conductive membrane layer 118. FIG. 4(f) shows the step of removing the top region 404 of the silicon substrate 402, where the membrane layer 118 spans across the cavity 110. FIG. 4(g) shows the step of depositing a bottom electrode layer 120 on the second silicon layer 108. The method can further include depositing a top electrode 122 on a top surface of the membrane layer 118, as shown in FIG. 4(h).

Figure 5:
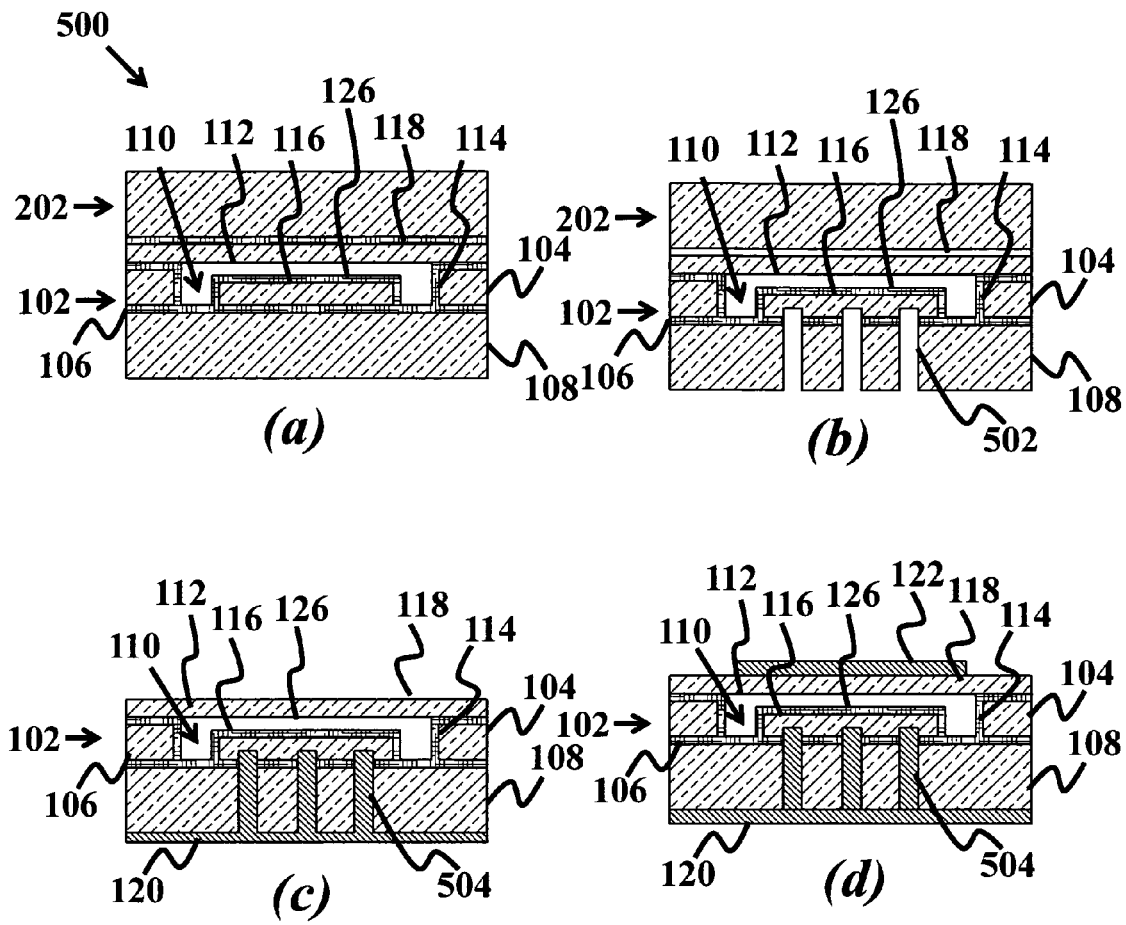
FIGS. 5(a)-5(h) show the steps of making different embodiments of the HTCMUT according to the present invention.
Figure 5:
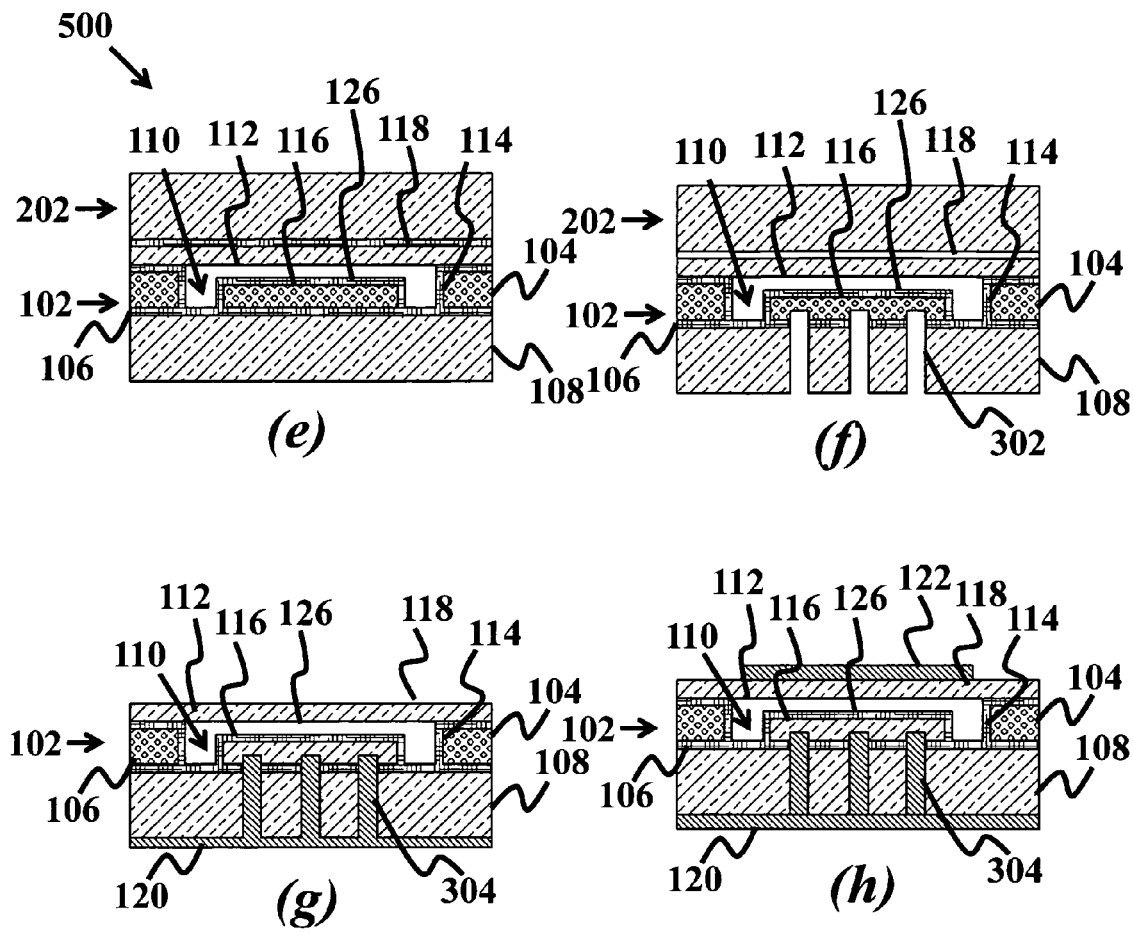

FIGS. 5(a)-5(h) show the steps for fabricating the embodiments shown in FIGS. 1(i)-1(l), that are similar to those of FIGS. 3(a)-3(h), where before removing the top region of the silicon substrate shown in FIG. 4(e), the method further includes providing at least one contact hole 502 disposed through the second silicon layer 108 and into the isolated silicon layer 116, then depositing a conductive layer 504 in the contact hole 502, where the conductive layer 504 in the contact hole 502 provides the conductive via 124 to the isolated silicon layer 116 from the bottom electrode layer 120 when it is deposited as shown in FIG. 5(d), where as shown in FIG. 5(e) the top electrode 122 is deposited on the membrane layer 118.

FIGS. 5(e)-5(h) show the steps for fabricating other conductive via-included embodiments show in FIGS. 1(k) and 1(l), where the first SOI substrate 102 has an undoped first silicon layer 104, and the isolated silicon layer 116 is undoped. Referring to FIG. 5(e), before removing the top region of the silicon substrate as shown in FIG. 4(e), the method further includes the steps of providing at least one contact hole 502 disposed through the second silicon layer 108 and into the isolated silicon layer 116, doping the undoped isolated silicon layer through the contact hole 502, as shown in the transition from FIG. 5(f) to FIG. 5(g). Then depositing a conductive layer 504 in the contact hole 502, where the conductive layer 304 in the contact hole 302 provides the conductive via 124 to the isolated silicon layer 116 from the bottom electrode layer 120 when it is deposited as shown in FIG. 5(g), where FIG. 5(h) shows the top electrode 122 deposited on the membrane layer 118.

Figure 6:
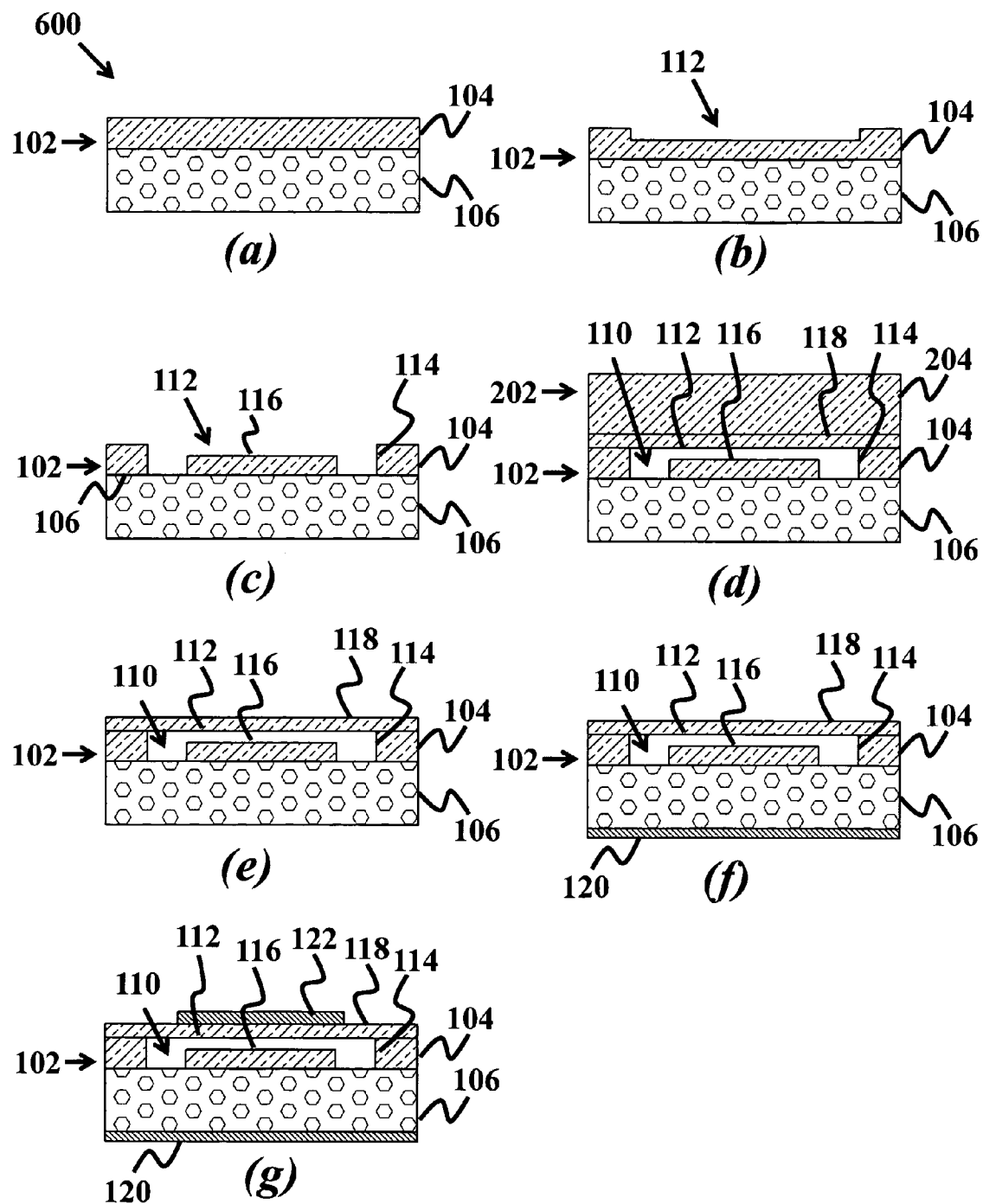
FIGS. 6(a)-6(g) show the steps of making different embodiments of the HTCMUT according to the present invention.

FIGS. 6(a)-6(g) show the steps for fabricating the HTCMUT 100 described in FIGS. 1(m)-1(r) according to one embodiment of the invention. Beginning with FIG. 6(a) the steps include providing the first silicon on insulator (SOI) substrate 102 that has the doped first silicon layer 104 disposed on a first insulating layer 106. FIG. 6(b) shows the step of forming the horizontal cavity portion 112 in the first silicon layer 104. FIG. 6(c) shows the step of forming the vertical cavity portions 114 at each end of the horizontal cavity portion 112, where the vertical cavity portion 114 spans from the first insulating layer 106 through the first silicon layer 104. FIG. 6(d) shows the step of bonding a silicon substrate 202 to the top surface of the first silicon layer 104, where a bottom region of the silicon substrate 202 is the membrane layer 118. FIG. 6(e) shows the step of removing the top region 204 of the silicon substrate 202, where the membrane layer 118 spans across the cavity 110.

FIG. 6(f) shows the step of depositing the bottom electrode layer 120 on the first insulating layer 106. FIG. 6(g) shows step of fabricating the embodiment of FIG. 1(n), which includes depositing the top electrode 122 on the top surface of the membrane layer 118, where as discussed above it is understood with other embodiments described below that, though the membrane layer 118 is shown as a conductive layer with the top electrode 122, it can also be a nonconductive membrane layer 118 with the top electrode 122. Some exemplary materials that are useful materials for the membrane layer can be undoped silicon, silicon nitride, undoped silicon carbide, nonconductive diamond, doped silicon, doped silicon carbide, and conductive diamond.

Figure 7:
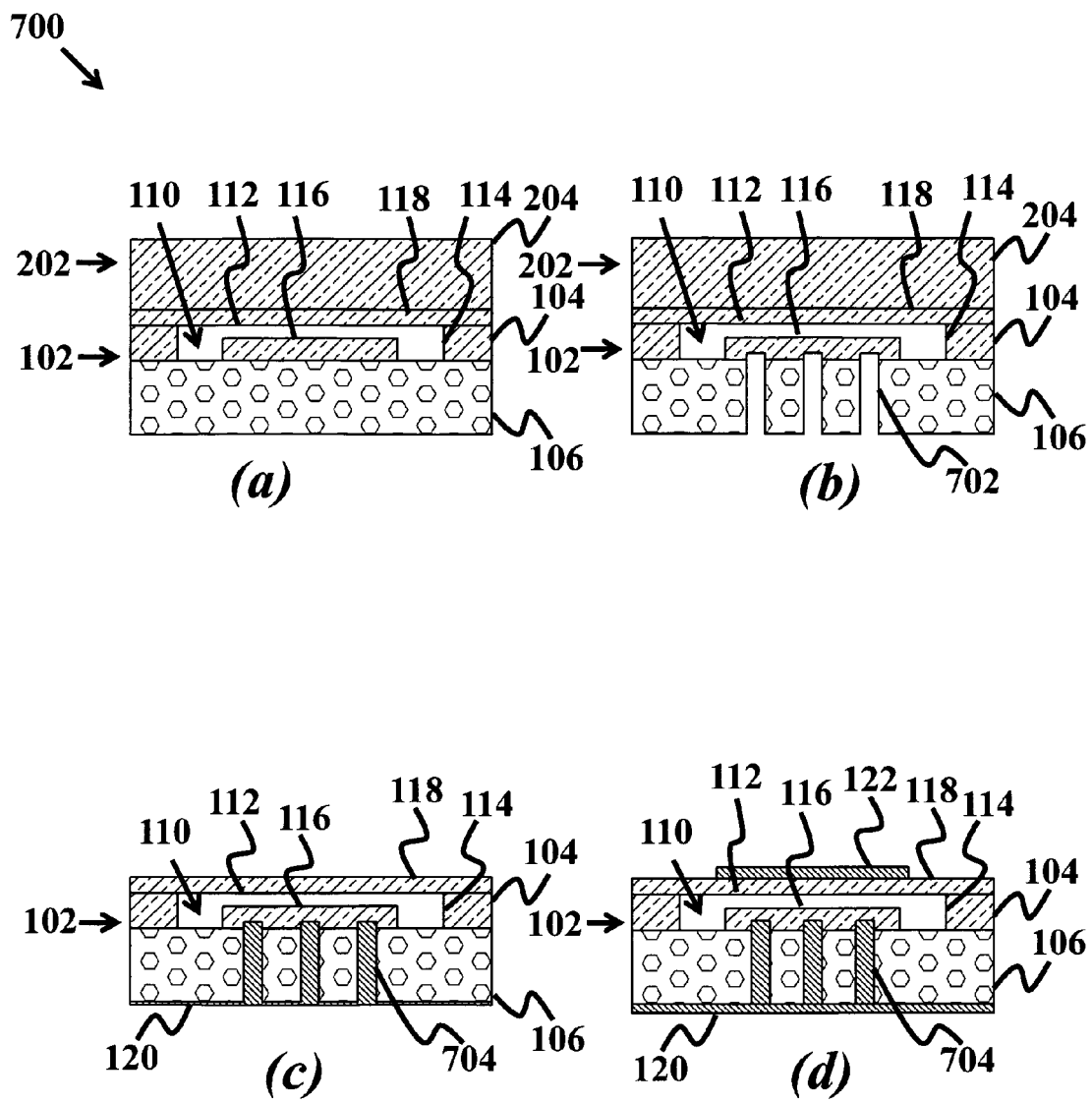
FIGS. 7(a)-7(h) show the steps of making different embodiments of the HTCMUT according to the present invention.
Figure 7:
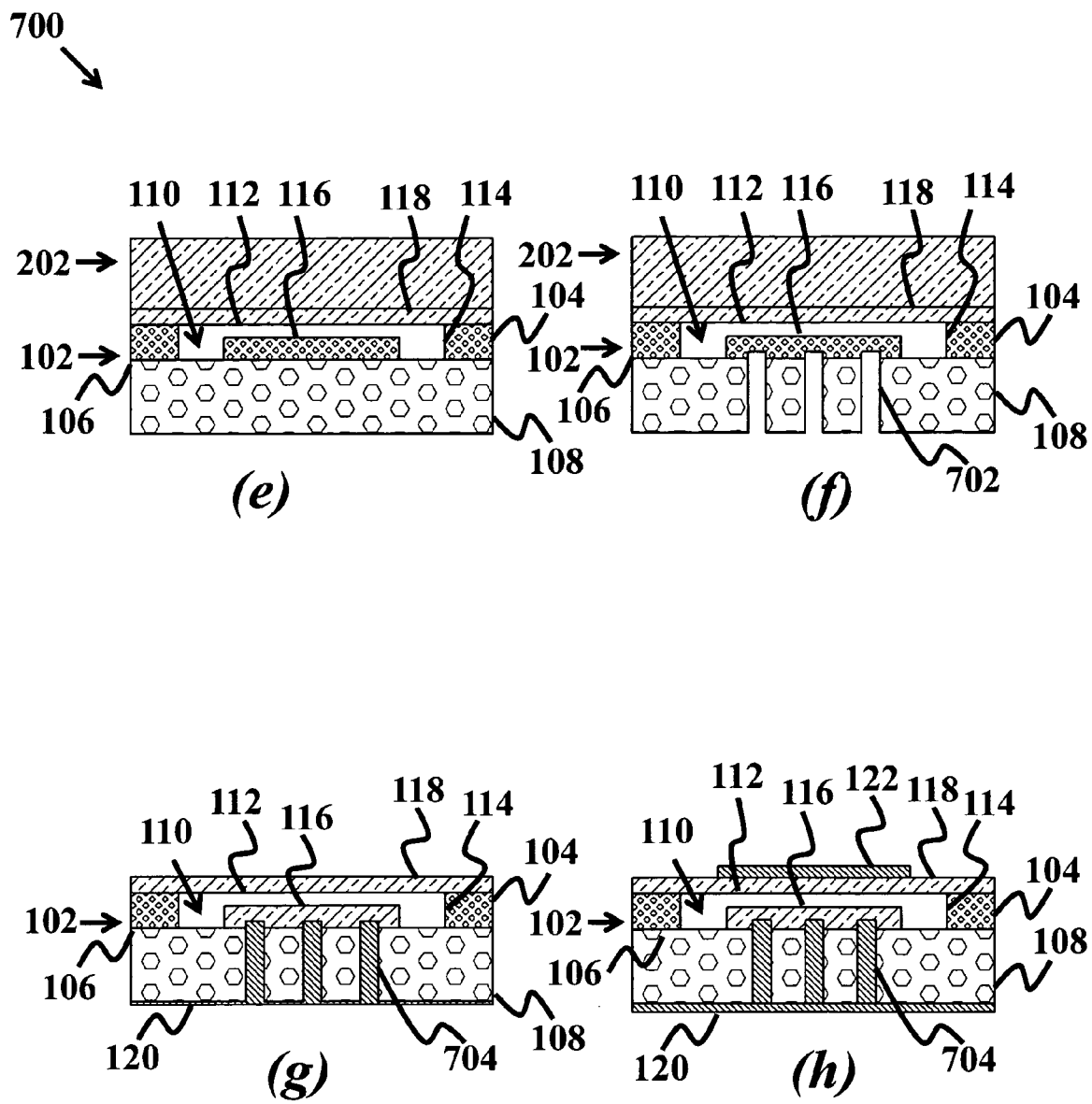

FIGS. 7(a)-7(d) show the steps for fabricating the conductive via-included embodiments 700 as shown in FIGS. 1(o) and 1(p). Referring to FIG. 7(a), before removing the top region of the silicon substrate, as shown in FIG. 6(d), the method further includes the steps of providing at least one contact hole 702 disposed through the first insulating layer 106 and into the isolated silicon layer 116, as shown in FIG. 3(b).

FIG. 7(c) shows the step of depositing a conductive layer 704 in the contact hole 702, where the conductive layer 704 in the contact hole 702 provides the conductive via 124 to the isolated silicon layer 116 from the bottom electrode layer 120 when it is deposited as shown in FIG. 7(d), where also shown is the top electrode 122 deposited on the membrane layer 118.

FIGS. 7(e)-7(h) show the steps for fabricating other conductive via-included embodiments show in FIGS. 1(q) and 1(r), where the first SOI substrate 102 has an undoped first silicon layer 104, and the isolated silicon layer 116 is undoped. Referring to FIG. 7(e), before removing the top region 204 of the silicon substrate as shown in FIG. 6(d), the method further includes the steps of providing at least one contact hole 702 disposed through the first insulating layer 106 and into the isolated silicon layer 116, doping the undoped isolated silicon layer through the contact hole 702, as shown in the transition from FIG. 7(f) to FIG. 7(g). Then depositing a conductive layer 704 in the contact hole 702, where the conductive layer 704 in the contact hole 702 provides the conductive via 124 to the isolated silicon layer 116 from the bottom electrode layer 120 when it is deposited as shown in FIG. 7(g), where FIG. 7(h) shows the top electrode 122 deposited on the membrane layer 118.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art.

All such variations are considered to be within the scope and spirit of the present invention as defined by the following claims and their legal equivalents.

What is claimed:

1. A high temperature micromachined ultrasonic transducer (HTCMUT) comprising:
   a. a silicon on insulator (SOI) substrate, wherein said SOI substrate comprises a doped first silicon layer and a first insulating layer;
   b. a doped second silicon layer, wherein said first insulating layer is disposed between said first silicon layer and said second silicon layer;
   c. a cavity in said first silicon layer, wherein a cross section of said cavity comprises a horizontal cavity portion on top of vertical cavity portions disposed at each end of said horizontal cavity portion, wherein said vertical cavity portion spans from said first insulating layer through said first silicon layer, wherein a portion of said first silicon layer is isolated by said first insulating layer and said cavity;
   d. a membrane layer, wherein said membrane layer is disposed on said first silicon layer top surface, wherein said membrane layer spans across said cavity; and
   e. a bottom electrode, wherein said bottom electrode is disposed on a bottom surface of said second silicon layer.

2. The HTCMUT of claim 1, wherein said silicon on insulator (SOI) substrate and said doped second silicon layer are a SOI wafer, wherein said SOI wafer comprises said doped first silicon layer, a buried said first insulating layer and said doped second silicon layer, wherein said first insulating layer is disposed between said first silicon layer and said second silicon layer.

3. The HTCMUT of claim 1, wherein said first insulating layer is an oxide layer.

4. The HTCMUT of claim 1, wherein said HTCMUT further comprises a top electrode, wherein said top electrode is disposed on a top surface of said membrane layer, wherein said membrane layer is a nonconductive layer or a conductive layer selected from a group consisting of undoped silicon, silicon nitride, undoped silicon carbide, nonconductive diamond, doped silicon, doped silicon carbide, and conductive diamond.

5. The HTCMUT of claim 1, wherein said membrane layer is made from a conductive material selected from a group consisting of doped silicon, doped silicon from a second said SOI substrate, silicon nitride, doped silicon carbide, doped polycrystalline silicon, undoped polycrystalline and conductive diamond, wherein said membrane layer is also an electrode.

6. The HTCMUT of claim 1, wherein said HTCMUT further comprises a second insulating layer, wherein said second insulating layer is disposed on a top surface of said first silicon layer, on the walls of said vertical cavity portion and on a top surface of said isolated silicon layer portion of said first silicon layer, wherein said isolated silicon layer portion is enveloped by said first insulating layer and said second insulating layer.

7. The HTCMUT of claim 6, wherein said second insulating layer is an insulating oxide layer, wherein said insulating oxide layer has a thickness in a range from 10 nm to 30 μm.

8. The HTCMUT of claim 1, wherein said cavity comprises a vacuum or a gas, wherein said gas is selected from a group consisting of air, noble gas, nitrogen, oxygen, hydrogen and carbon dioxide.

9. The HTCMUT of claim 1, wherein said HTCMUT further comprises at least one conductive via, wherein said conductive via is disposed through said second silicon layer and into said isolated silicon layer, wherein said conductive via is in contact with said bottom electrode layer.

10. The HTCMUT of claim 8, wherein said first silicon layer of said SOI substrate is undoped, wherein said isolated silicon layer is doped, wherein said via is a conduit for doping said isolated silicon layer.

11. The HTCMUT of claim 8, wherein said conducting via has a hole diameter in a range of 1 μm to 100 μm.

12. The HTCMUT of claim 1, wherein said first silicon layer has a thickness in a range from 1 μm to 1,000 μm.

13. The HTCMUT of claim 1, wherein said second silicon layer has a thickness in a range from 1 μm to 1,000 μm.

14. The HTCMUT of claim 1, wherein said membrane layer has a thickness in a range from 0.1 μm to 500 μm.

15. The HTCMUT of claim 1, wherein said buried oxide layer has a thickness in a range from 0.01 μm to 60 μm.

16. The HTCMUT of claim 1, wherein said horizontal cavity portion has a thickness in a range from 10 nm to 500 μm.

17. The HTCMUT of claim 1, wherein said isolated silicon layer has a thickness in a range from 1 μm to 1,000 μm.

18. The HTCMUT of claim 1, wherein said first insulating layer disposed on said top surface of said first silicon layer is thicker than a second insulating layer disposed on said vertical cavity portion and on said top surface of said isolated silicon layer portion.

19. The HTCMUT of claim 18, wherein said second insulating layer disposed on said vertical cavity portion and said top surface of said isolated silicon layer portion has a thickness in a range of 1 nm to 10 μm.

20. A high temperature micromachined ultrasonic transducer (HTCMUT) comprising:
 a. a doped first silicon layer;
 b. a first insulating layer, wherein said first conductive silicon layer is disposed on said first insulating layer;
 c. a cavity in said first silicon layer, wherein a cross section of said cavity comprises a horizontal cavity portion on top of vertical cavity portions disposed at each end of said horizontal cavity portion, wherein said vertical cavity portion spans from said first insulating layer through said first silicon layer, wherein a portion of said first silicon layer is isolated by said insulating layer and said cavity;
 d. a membrane layer, wherein said membrane layer is disposed on said first silicon layer top surface, wherein said membrane layer spans across said cavity; and
 e. a bottom electrode, wherein said bottom electrode is disposed on a bottom surface of said first insulating layer.

21. The HTCMUT of claim 20, wherein said first insulating layer is selected from a group consisting of oxide, quartz, glass, pyrex, soda lime, borosilicate, borofloat glass, fused quartz, fused silica, alumina, and sapphire.

22. The HTCMUT of claim 20, wherein said HTCMUT further comprises a top electrode, wherein said top electrode is disposed on a top surface of said membrane layer, wherein said membrane layer is a nonconductive layer or a conductive layer selected from a group consisting of undoped silicon, silicon nitride, undoped silicon carbide, nonconductive diamond, doped silicon, doped silicon carbide, and conductive diamond.

23. The HTCMUT of claim 20, wherein said membrane layer is made from a conductive material selected from a group consisting of doped silicon, doped silicon from a second said SOI substrate, silicon nitride, doped silicon carbide, doped polycrystalline silicon, undoped polycrystalline and conductive diamond, wherein said membrane layer is also an electrode.

24. The HTCMUT of claim 20, wherein said HTCMUT further comprises a second insulating layer, wherein said second insulating layer is disposed on a top surface of said first silicon layer, on the walls of said vertical cavity portion and on a top surface of said isolated silicon layer portion of said first silicon layer, wherein said isolated silicon layer portion is enveloped by said first insulating layer and said second insulating layer.

25. The HTCMUT of claim 24, wherein said second insulating layer is an insulating oxide layer.

26. The HTCMUT of claim 24, wherein said second insulating layer has a thickness in a range of 1 nm to 30 μm.

27. The HTCMUT of claim 20, wherein said cavity comprises a vacuum or a gas, wherein said gas is selected from a group consisting of air, noble gas, nitrogen, oxygen, hydrogen and carbon dioxide.

28. The HTCMUT of claim 20, wherein said HTCMUT further comprises at least one conductive via, wherein said conductive via is disposed through said first insulating layer and into said isolated silicon layer, wherein said conductive via is in contact with said bottom electrode layer.

29. The HTCMUT of claim 26, wherein said conducting via has a hole diameter in a range of 1 μm to 100 μm.

30. The HTCMUT of claim 20, wherein said first insulating layer has a thickness in a range from 1 μm to 1,000 μm.

31. The HTCMUT of claim 20, wherein said first silicon layer has a thickness in a range from 1 μm to 1,000 μm.

32. The HTCMUT of claim 20, wherein said horizontal cavity portion has a thickness in a range from 10 nm to 500 μm.

33. The HTCMUT of claim 20, wherein said isolated silicon layer has a thickness in a range from 1 μm to 1,000 μm.

* * * * *